United States Patent [19]

Bell

[11] Patent Number: 4,795,213
[45] Date of Patent: Jan. 3, 1989

[54] GEAR OPERATED SEAT RECLINER WITH REDUNDANT POSITIONING

[75] Inventor: Robert L. Bell, Oxford, Mich.

[73] Assignee: Fisher Dynamics Corporation, St. Clair Shores, Mich.

[21] Appl. No.: 24,885

[22] Filed: Mar. 11, 1987

Related U.S. Application Data

[63] Continuation of Ser. No. 701,078, Feb. 13, 1985, abandoned.

[51] Int. Cl.⁴ .............................................. B60N 1/02
[52] U.S. Cl. .................................... 297/367; 297/379
[58] Field of Search ............... 297/366, 367, 368, 369, 297/378, 379, 354, 355

[56] References Cited

U.S. PATENT DOCUMENTS

| | | |
|---|---|---|
| 3,887,232 | 6/1975 | Dinkel . |
| 3,900,225 | 8/1975 | Wirtz et al. ......................... 297/367 |
| 3,907,361 | 9/1975 | Lehmann . |
| 4,113,308 | 9/1978 | Werner et al. ................... 297/379 X |
| 4,295,682 | 10/1981 | Kluting et al. ................... 297/366 X |
| 4,437,703 | 3/1984 | Nishikori et al. . |
| 4,457,557 | 7/1984 | Une . |

Primary Examiner—Peter A. Aschenbrenner
Assistant Examiner—Thomas A. Rendos
Attorney, Agent, or Firm—Harness, Dickey & Pierce

[57] ABSTRACT

A gear operated seat recliner mechanism is described which is particularly useful in connection with motor vehicle occupant seats. The recliner permits the angle between the seat back and seat bottom to be varied as desired by the seat occupant. In accordance with this invention, the upper recliner structure pivots about the lower recliner structure and a quadrant component which pivots with the upper recliner structure includes a curved toothed rack which meshes with a gear. A locking pawl is movable between a position of engagement with the gear to fix the seat back angle to a disengaged position, permitting the seat back angle to be adjusted. Further, a restraint pawl is provided which acts upon the curved toothed rack in the event that the locking pawl or recliner gear fails, thereby providing a redundant means for fixing the relative angular position between the upper and lower recliner structures.

33 Claims, 2 Drawing Sheets

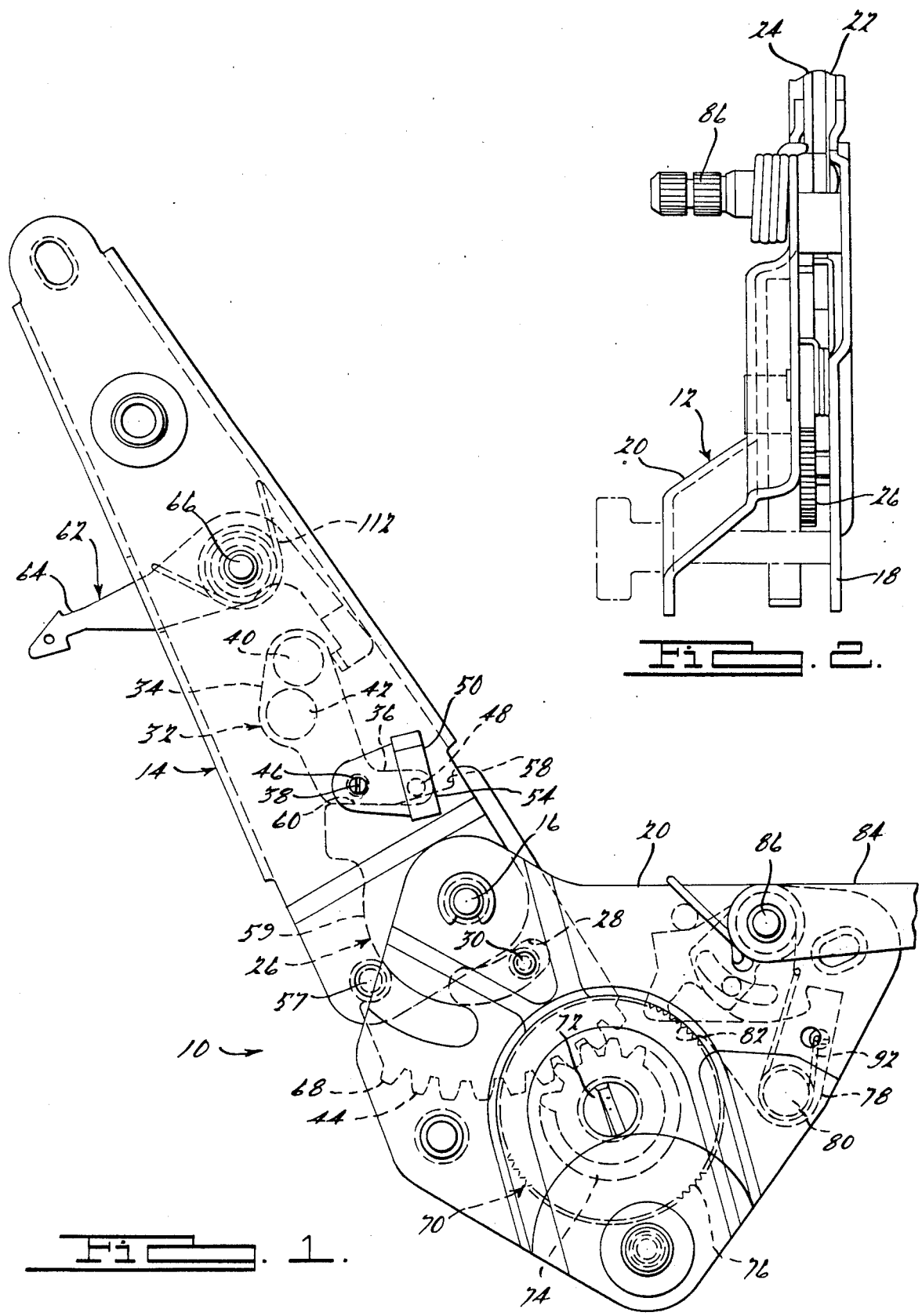

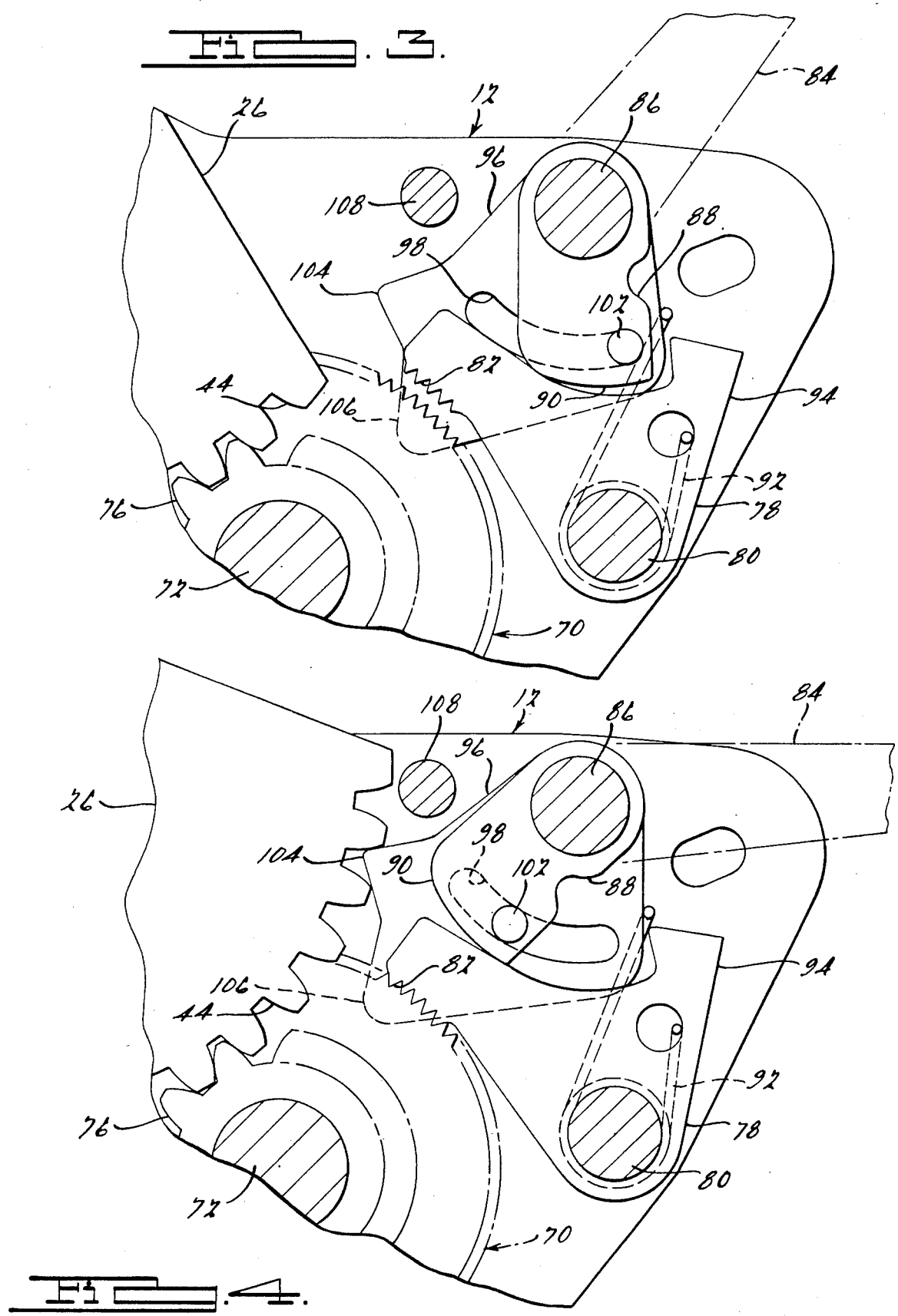

GEAR OPERATED SEAT RECLINER WITH REDUNDANT POSITIONING

This is a continuation of U.S. patent application Ser. No. 701,078, filed Feb. 13, 1985, now abandoned, entitled GEAR OPERATED SEAT RECLINER WITH REDUNDANT POSITIONING.

BACKGROUND AND SUMMARY OF THE INVENTION

This invention relates to seat recliner mechanisms and, more particularly, to such devices adapted for motor vehicle applications which permit the angle of the seat back relative to the seat bottom to be varied in accordance with the desires of the seat occupant.

Many motor vehicles are now being provided with seat recliner mechanisms which provide added comfort and convenience for the vehicle occupants. Numerous types of seat recliner mechanisms are known according to the prior art. For example, U.S. Pat. No. 4,372,610, issued to A. J. Fisher, III, et al on Feb. 8, 1983, describes a recliner employing a pair of meshing straight toothed racks. One of the racks is connected to the upper recliner structure through a quadrant component. Adjustment of the seat reclined position is accomplished by changing the meshed position of one rack with respect to the other.

Although seat recliner mechanisms according to the prior art perform satisfactorily, it is desirable to provide a seat recliner mechanism having a redundant system for controlling the position of the seat back, thereby preventing unrestrained movement of the seat back in the event of the mechanical failure or improper operation of a recliner component.

The above features for a motor vehicle seat recliner mechanism are provided in accordance with the invention by employing a curved toothed rack on a component which rotates with the upper recliner structure and which meshes with a recliner gear that is rotatable within the lower recliner structure. The seat back and bottom are connected to the recliner upper and lower structures respectively. Locking of the seat back may be achieved in any number of ways, for example, by causing teeth of a locking pawl to engage the gear. Adjustment of the seat back angle is provided when the locking pawl is withdrawn from engagement with the gear, thereby permitting gear rotation as the upper recliner mechanism and the seat back rotate about their pivot points. Further, a restraint pawl is provided which prevents uncontrolled movement of the upper recliner structure in the event that the recliner gear, locking pawl or other related component fails.

The recliner mechanism according to this invention is usable for motor vehicle seats which are installed in two or four door type vehicles. In four door models, the front seat back does not need to be folded forward to permit access to the rear seat occupant area. However, in two-door designs having a rear seat occupant area, such provisions are necessary. This invention is described in conjunction with an inertia sensitive seat back locking device according to prior art designs which normally permits seat back folding but acts to prevent folding when the vehicle is subjected to deceleration above a predetermined level. The benefits and advantages of this invention are, however, equally applicable to seat recliners which do not have inertia sensitive seat back locking systems such as those intended for two-door car applications.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a side elevational view of the seat recliner mechanism according to the teachings of the present invention shown with the upper recliner structure in a locked position;

FIG. 2 is a partial front elevational view of the seat recliner mechanism shown by FIG. 1.

FIG. 3 is a partial enlarged side elevational view of the recliner components shown in a position permitting the seat back angle to be adjusted.

FIG. 4 is a partial enlarged side elevational view of the recliner components shown in a position wherein the upper recliner structure is locked and the restraint pawl is shown engaging the toothed rack of the quadrant component.

DETAILED DESCRIPTION OF THE INVENTION

A motor vehicle seat recliner mechanism according to this invention is shown in each of the Figures and is generally designated there by reference character 10. The embodiment of recliner mechanism 10 described herein and by the accompanying figures is intended to be positioned at the righthand side of a motor vehicle passenger's seat. A recliner structure useful for a driver's seat would preferably employ components which are mirror image replications of those described herein. Recliner 10 includes lower recliner structure 12 which is attached to a seat bottom frame (not shown). Upper recliner structure 14 is attached to the seat back frame (not shown) and is adapted to rotate with respect to lower recliner structure 12 about pivot pin 16. Lower recliner structure 12 is fabricated by attaching two plates, inner lower recliner plate 18 and outer lower recliner plate 20. These plates are attached together by rivets and define a space therebetween within which additional components, which will hereinafter be described, are installed. Upper recliner structure 14 is similarly fabricated by attaching two plates, inner upper recliner plate 22 and outer upper recliner plate 24. These plates are also formed to define a space therebetween.

Journaled to pivot pin 16 is quadrant 26. The position of quadrant 26 establishes the angular position of upper recliner structure 14 with respect to lower recliner structure 12, and therefore, between the seat back and bottom. Quadrant 26 is provided as a component which is separate from upper recliner structure 14. This configuration is particularly suited for use in two-door model cars enabling the upper recliner structure 14 to be pivoted with respect to quadrant 26, thereby providing access to the rear seating area. For four-door models where seat back folding is unnecessary, quadrant 26, or its functional equivalent, may be fastened directly to upper recliner structure 14 or be made integral therewith. In applications wherein seat back folding is desired, recliner mechanism 10 would further preferably include inertia sensitive actuator 32 which interacts with quadrant 26 and responds to vehicle deceleration to prevent forward displacement of the seat back. Many forms of inertia sensitive actuator 32 are known according to the prior art and could be incorporated into devices within the scope of this invention. Several such devices are described by the previously mentioned patent and in copending patent applications, Ser. Nos. 602,370, filed Apr. 20, 1984; 632,597, filed July 19, 1984; 589,229, filed Mar. 14, 1984; and 594,742, filed Mar. 29, 1984, each of which are assigned to the assignee of this application.

Inertia actuator 32 includes upper weighted section 34, lower engaging portion 36 with bore 38 therebetween. Upper weighted section 34 includes a pair of weights 40 and 42. Pivot pin 46 is attached to upper recliner structure 14 and passes through bore 38 and cooperates to form a low friction bearing permitting free rotation of actuator 32. The actuator is configured such that its centroid of mass (center of gravity) lies above pivot pin 46 so that, upon vehicle deceleration, the actuator 42 moves forward and the actuator is caused to rotate in a clockwise direction, with respect to the orientation shown by FIG. 1. Engaging portion 36 of actuator 32 supports engaging pin 48 which is retained in association with the engaging section since it is trapped between locally deformed portions 50 and 52 (not shown) which forms slots 54 and 56 (not shown) respectively. Quadrant 26 includes a notched upper portion defining stop surface 58. Therefore, when a predetermined level of vehicle deceleration is sensed by actuator 32, the forward movement of upper recliner structure 14 is limited due to engagement of engaging pin 48 with stop surface 58 of quadrant 26, and the edges of slots 54 and 56. Under normal circumstances, the seat back may be freely rotated forward since engaging pin 48 is permitted to escape engagement with surface 58. Such escapement is provided by placement of the centroid of mass (center of gravity) of actuator 32 such that the actuator is normally biased by gravity in a counterclockwise direction. Pin 57 connected to upper recliner structure 14 moves within open sided slot 59 of quadrant 26 to limit the maximum angular displacement of the upper recliner structure.

In order to provide enhanced reliability of engagement between actuator 32 and stop surface 58, curved quadrant surface 60 is provided which contacts the actuator such that it is biased counterclockwise to an engaged position when the seat back is in its normal position. Slight forward rotation of the seat back relieves this bias and enables actuator 32 to either cause engaging pin 48 to escape engagement with stop surface 58, or engage with the stop surface in response to vehicle deceleration.

An emergency releasing mechanism is provided to enable rear seat occupants to extract themselves from the vehicle in the event of failure of the inertia sensitive components of the seat recliner or in the event that vehicle inclination causes the recliner mechanism to latch. Therefore, release actuator 62 is provided having a rearwardly projecting portion 64 which may be rotated about pivot pin 66 by the rear seat occupants so that inertia sensitive actuator 32 is caused to rotate in a counterclockwise position about pivot pin 46, thereby withdrawing engaging pin 48 from engagement with stop surface 58 and permitting the seat back to be folded forward. Release actuator 62 is biased by torsion spring 112.

The above described components enable relative rotation to occur between quadrant 26 and upper recliner structure 14 when seat folding is desired. Following is a description of the components and their cooperation which enable the seat occupant to select a desired seat back reclined angle. Quadrant 26 forms a curved, toothed rack 68 having teeth 44 which lie along an arc centered at pivot 16. Recliner gear 70 is supported by lower recliner structure 12 and is journaled for rotation about pin 72. Recliner gear 70 defines a pair of gear elements, quadrant engaging gear element 74 and pawl engaging gear element 76. Preferably pawl engaging gear portion 76 has a diameter substantially larger than that of quadrant engaging gear section 74. Toothed rack 68 of the quadrant meshes with quadrant engaging gear element 74 such that angular movement of quadrant 26 about pivot pin 16 causes rotation of recliner gear 70.

The rotational position of recliner gear 70 and therefore the seat back reclined angle may be controlled in various ways, for example, by using friction clutches or locking pawls. In accordance with the embodiments depicted by the attached figures, recliner gear 70 is restrained by engagement between locking pawl 78 and pawl engaging gear element 76. Locking pawl 78 is pinned for pivotable movement with respect to lower recliner structure 12 by pin 80. Locking pawl 78 has a toothed portion 82 having a surface configuration for meshing engagement with pawl engaging gear element 76. Locking pawl 78 is selectively engageable or disengageable with recliner gear 70 through actuation of actuator lever 84 which is splined or otherwise rigidly connected to shaft 86. Cam 88 is connected to shaft 86 and has a lower cam surface 90 which engages locking pawl 78 to urge the pawl into contact with recliner gear 70 when it is in one angular position, and relieve engagement while in another angular position. Locking pawl 78 is biased by coil torsion spring 92 in a position out of engagement with gear element 76, thereby pulling it from engagement therewith once cam 88 has been rotated to a disengaging position. Therefore, the occupant of the seat can select the desired seat back angle by lifting upwardly on actuator lever 84, thereby causing cam 88 to rotate in a counterclockwise direction with respect to the orientation of figures of components shown in FIG. 1, thereby enabling pawl 78 to be moved from engagement with gear element 76 and therefore enabling free rotation of the seat back. In the event that torsion spring 92 fails, rotation of actuator handle will cause cam 88 to interfere with pawl projecting portion 94 to urge pawl out of engagement with recliner gear 70. The angular displacement of quadrant 26 with respect to lower recliner structure 12 is limited by providing pin 30 in the lower recliner structure which travels within quadrant slot 28.

In accordance with a principal feature of this invention, a redundant means for controlling the position of upper recliner structure 14 is provided in addition to recliner gear 70 and locking pawl 78. This feature is provided to prevent the unrestrained rotation of upper recliner structure 14 in the event that one of the previously mentioned components suffers a mechanical failure or malfunctions. Absent a redundancy feature, such occurrence could substantially impair the utility of the associated vehicle, particularly if it occurs at a driver's seating position. The redundant restraining feature for the upper recliner structure is provided by employing restraint pawl 96 which is loosely fit onto shaft 86 for relative rotation therewith. Stop pin 108 is attached to lower recliner structure 12 to limit angular movement of restraint pawl 96. Restraint pawl 96 defines an arcuate slot 98 within which pin 102 connected to cam 88 travels. Restraint pawl 96 defines a projecting tooth 104 and ramp surface 106. Restraint pawl 96 is urged to rotate in a clockwise direction by connecting one of the ends of torsion spring 92 thereto.

The operation of recliner 10 will now be described with particular reference to FIGS. 1, 3 and 4. FIG. 1 represents the relative position of components when the seat back angle is locked in a nearly upright position. If a component which restrains the position of the upper recliner structure 14, for example, recliner gear 70 fails or malfunctions, quadrant 26 will be caused to rotate in a counterclockwise direction due to the force applied by the occupant on the seat back until it reaches a position wherein the quadrant engages ramp surface 106 and approaches contact with or contacts projecting tooth 104. Continued counterclockwise rotation of quadrant 26 will be prevented due to interference with restraint pawl 96. The position which upper recliner structure 14 assumes when restraint pawl 96 contacts quandrant 26 is selected to provide a reclined angle which permits the vehicle driver to continue to operate the motor vehicle.

FIG. 3 illustrates the position of components when actuator lever 84 is rotated in a counterclockwise direction by a user. In this position, pin 102 is caused to move within slot 98 until it reaches the end of that slot at which point restraint pawl 96 rotates in a counterclockwise direction. Movement of restraint pawl 96 in this manner enables the user to adjust the seat back position to a desired location, since projecting tooth 104 and ramp surface 106 are moved away from a position where interference with toothed rack of quadrant 26 could occur.

FIG. 4 represents the position of components of recliner mechanism 10 when the seat back is adjusted to a locked recliner position near the extreme back position. According to this figure, locking pawl 78 is in engagement with recliner gear 70. As actuator lever 84 is returned to this position, restraint pawl projecting tooth 104 is urged into registry with a tooth 44 of quadrant 26 by torsion spring 92. In this orientation of the components, if recliner gear 70, locking pawl 78 or an associated component were to suffer a mechanical failure or malfunction engagement between projecting tooth 104 and the teeth of quadrant 26 would prevent unrestrained motion of the seat back. Even though the function of these components had been impaired, continued adjustment over the seat back angle would be permitted as the actuator handle is rotated to a released position since the seat back could be positioned such that projecting tooth 104 engages with another of the quadrant teeth 44. This adjustment, however, would not be as fine in graduations, and further, an adjusted position which is nearly upright would not be permitted since failure would permit the seat back to rotate to the position of components depicted by FIG. 3. Therefore, although the function of the recliner would be preserved, the user would be provided with a definite indication that servicing of the recliner is necessary.

While the above description constitutes the preferred embodiments of the present invention, it will be appreciated that the invention is susceptible to modification, variation and change without departing from the proper scope and fair meaning of the accompanying claims.

What is claimed is:

1. A seat recliner mechanism for supporting a seat back and seat bottom which permits the reclining angle therebetween to be adjusted, comprising:
   a lower recliner structure adapted for supporting said seat bottom;
   an upper recliner structure adapted for supporting said seat back, said upper recliner structure having a curved toothed rack formed along an edge thereof,
   first pin means for rotatably attaching said lower recliner structure to said upper recliner structure,
   second pin means connected to said lower recliner structure,
   a recliner gear rotatable about said second pin means, said recliner gear meshing with said toothed rack,
   an actuator carried by said lower recliner structure,
   locking means for selectively restraining rotation of said recliner gear, said locking means carried by said lower recliner structure and operatively connected to said actuator for movement from an engaged position restraining said recliner gear from rotation thereby fixing said reclining angle to a released position wherein said recliner gear is free to rotate thereby enabling said reclining angle to be adjusted, and
   a restraint pawl connected to said lower recliner structure and engageable with said upper recliner structure, said restraint pawl acting in parallel with said locking means and operatively connected to said actuator for movement from an engaging position with said upper recliner structure to limit pivoting movement of said upper recliner structure with respect to said lower recliner structure when said locking means is in said engaged position whereby said restraint pawl will limit said pivoting movement in the event of a malfunction of said locking means and said restraint pawl movable to a released position permitting said reclining angle to be adjusted when said locking means is in said released position.

2. The seat recliner mechanism according to claim 1 wherein said locking means comprises a locking pawl connected to said lower recliner structure and engageable with said recliner gear, and means for positioning said locking pawl into or out of engagement with said recliner gear.

3. The seat recliner mechanism according to claim 2 wherein said locking pawl is fixed to said lower recliner structure for pivoting movement and said seat recliner mechanism further comprises first spring means for biasing said locking pawl out of engagement with said recliner gear.

4. The seat recliner mechanism according to claim 3 further comprising second spring means for biasing said restraint pawl toward a position of engagement with said upper recliner structure.

5. The seat recliner mechanism according to claim 4 wherein said first and second spring means comprise a single coil torsion spring having one end engaging said locking pawl and another end engaging said restraint pawl.

6. The seat recliner mechanism according to claim 2 wherein said means for positioning said locking pawl comprises, a shaft journaled to said lower recliner structure, a cam connected to said shaft, and an actuation handle for enabling rotation of said shaft, said cam having a cam surface which urges said locking pawl into engagement with said recliner gear in one angular position of said shaft, and relieves said urging in another angular position of said shaft.

7. The seat recliner mechanism according to claim 1 wherein said restraint pawl is affixed to said lower recliner structure for rotation therein.

8. The seat recliner mechanism according to claim 1 wherein said restraint pawl defines a projection engageable with said upper recliner structure to thereby restrain motion of said upper recliner structure.

9. The seat recliner mechanism according to claim 1 wherein said restraint pawl is engageable with said toothed rack.

10. A seat recliner mechanism for supporting a seat back and seat bottom which permits the reclining angle therebetween to be adjusted, comprising:
   a lower recliner structure adapted for supporting said seat bottom,
   an upper recliner structure adapted for supporting said seat back, said upper recliner structure having a curved toothed rack formed along an edge thereof,
   first pin means for rotatably attaching said lower recliner structure to said upper recliner structure,
   second pin means connected to said lower recliner structure,
   a recliner gear rotatable about said second pin means, said recliner gear meshing with said toothed rack,
   an actuator carried by said lower recliner structure,
   locking means for selectively restraining rotation of said recliner gear, said locking means carried by said lower recliner structure and coupled to said actuator for movement from an engaged position restraining said recliner gear from rotation thereby fixing said reclining angle to a released position wherein said recliner gear is free to rotate thereby enabling said reclining angle to be adjusted, said locking means comprising a locking pawl connected to said lower recliner structure and engageable with said recliner gear, and means for positioning said locking pawl into or out of engagement with said recliner gear further comprising a shaft journaled to said lower recliner structure, a cam connected to said shaft, and an actuation handle for enabling rotation of said shaft, said cam having a cam surface which urges said locking pawl into engagement with said recliner gear in one angular position of said shaft, and relieves said urging in another angular position of said shaft, and
   a restraint pawl connected to said lower recliner structure and engageable with said upper recliner structure, said restraint pawl being carried by said shaft for relative rotation thereabout, said restraint pawl acting with said locking means and coupled to said actuator for movement from an engaging position with said upper recliner structure to limit pivoting movement of said upper recliner structure with respect to said lower recliner structure when said locking means is in said engaged position whereby said restraint pawl will limit said pivoting movement in the event of a malfunction of said locking means and said restraint pawl is movable to a released position permitting said reclining angle to be adjusted when said locking means is in said released position.

11. The seat recliner mechanism according to claim 10 further comprising means for causing rotation of said restraint pawl once said cam has been rotated beyond a predetermined angular extent.

12. The seat recliner mechanism according to claim 11 wherein said means for causing rotation of said restraint pawl comprises a third pin means connected to said cam and said restraint pawl defines an arcuate slot, said third pin means and said slot cooperating such that rotation of said shaft beyond said predetermined angular extent causes rotation of said restraint pawl.

13. A seat recliner mechanism for supporting a seat back and seat bottom which permits the reclining angle therebetween to be adjusted, comprising:
   a lower recliner structure adapted for supporting said seat bottom,
   an upper recliner structure adapted for supporting said seat back,
   a quadrant which controls the relative angular position between said upper and lower recliner structures having a curved toothed rack formed along an edge thereof,
   first pin means for rotatably connecting said lower recliner structure, said upper recliner structure and said quadrant,
   second pin means connected to said lower recliner structure,
   a recliner gear rotatable about said second pin means, said recliner gear meshing with said quadrant toothed rack,
   an actuator carried by said lower recliner structure,
   locking means for selectively restraining rotation of said recliner gear, said locking means carried by said lower recliner structure and operatively connected to said actuator for movement from an engaged position restraining said recliner gear from rotation thereby fixing said reclining angle to a released position wherein said recliner gear is free to rotate for enabling said reclining angle to be adjusted, and
   a restraint pawl connected to said lower recliner structure engageable with said quadrant for limiting movement of said quadrant, said restraint pawl acting in parallel with said locking means and operatively connected to said actuator for movement from an engaging position with said upper recliner structure to limit pivoting movement of said upper recliner structure with respect to said lower recliner structure when said locking means is in said engaged position whereby said restraint pawl will limit said pivoting movement in the event of malfunction of said locking means and said restraint pawl movable to a released position permitting said reclining angle to be adjusted when said locking means is in said released position.

14. The seat recliner mechanism according to claim 13 wherein said locking means comprises a locking pawl connected to said lower recliner structure and engageable with said recliner gear, and means for positioning said locking pawl into or out of engagement with said recliner gear.

15. The seat recliner mechanism according to claim 14 wherein said locking pawl is fixed to said lower recliner structure for pivoting movement and said seat recliner mechanism further comprises first spring means for biasing said locking pawl out of engagement with said recliner gear.

16. The seat recliner mechanism according to claim 15 further comprising second spring means for biasing said restraint pawl toward a position of engagement with said toothed rack.

17. The seat recliner mechanism according to claim 16 wherein said first and second spring means comprise a single coil torsion spring having one end engaging said locking pawl and another end engaging said restraint pawl.

18. The seat recliner mechanism according to claim 14 wherein said means for positioning said locking pawl comprises, a shaft journaled to said lower recliner structure, a cam connected to said shaft, and an actuation handle for enabling rotation of said shaft, said cam having a cam surface which urges said locking pawl into engagement with said recliner gear in one angular position of said shaft and relieves said urging in another angular position of said shaft.

19. The seat recliner mechanism according to claim 13 wherein said restraint pawl is affixed to said lower recliner structure for rotation therein.

20. The seat recliner mechanism according to claim 13 wherein said restraint pawl defines a projection engageable with said quadrant to thereby restrain motion of said upper recliner structure.

21. A seat recliner mechanism for supporting a seat back and seat bottom which permits the reclining angle therebetween to be adjusted, comprising:
 a lower recliner structure adapted for supporting said seat bottom,
 an upper recliner structure adapted for supporting said seat back,
 a quadrant which controls the relative angular position between said upper and lower recliner structures having a curved toothed rack formed along an edge thereof,
 first pin means for rotatably connecting said lower recliner structure, said upper recliner structure and said quadrant,
 second pin means connected to said lower recliner structure,
 a recliner gear rotatable about said second pin means, said recliner gear meshing with said quadrant toothed rack,
 a actuator carried by said lower recliner structure,
 locking means for selectively restraining rotation of said recliner gear, said locking means carried by said lower recliner structure and coupled to said actuator for movement from an engaged position restraining said recliner gear from rotation thereby fixing said reclining angle to a released position wherein said recliner gear is free to rotate for enabling said reclining angle to be adjusted, said locking means comprising a locking pawl connected to said lower recliner structure and engageable with said recliner gear, and means for positioning said locking pawl into or out of engagement with said recliner gear comprising a shaft journaled to said lower recliner structure, a cam connected to said shaft, and an actuation handle for enabling rotation of said shaft, said cam having a cam surface which urges said locking pawl into engagement with said recliner gear in one angular position of said shaft and relieves said urging in another angular position of said shaft, and
 a restraint pawl connected to said lower recliner structure engageable with said quadrant for limiting movement of said quadrant, said restraint pawl being carried by said shaft for relative rotation thereabout, said restraint pawl acting with said locking means and coupled to said actuator for movement from an engaging position with said upper recliner structure to limit pivoting movement of said upper recliner structure with respect to said lower recliner structure when said locking means is in said engaged position whereby said restraint pawl will limit said pivoting movement in the event of malfunction of said locking means and said restraint pawl is movable to a released position permitting said reclining angle to be adjusted when said locking means is in said released position.

22. The seat recliner mechanism according to claim 21 further comprising means for causing rotation of said restraint pawl once said cam has been rotated beyond a predetermined angular extent.

23. The seat recliner mechanism according to claim 22 wherein said means for causing rotation of said restraint pawl comprises a third pin means connected to said cam and said restraint pawl defines an arcuate slot, said third pin means and said slot cooperating such that rotation of said shaft beyond said predetermined angular extent causes rotation of said restraint pawl.

24. A seat recliner mechanism for supporting a seat back and seat bottom which permits the reclining angle therebetween to be adjusted, comprising:
 a lower recliner structure adapted for supporting said seat bottom,
 an upper recliner structure adapted for supporting said seat back, said upper recliner structure having a curved toothed rack formed along an edge thereof,
 first pin means for rotatably attaching said lower recliner structure to said upper recliner structure,
 second pin means connected to said lower recliner structure,
 a recliner gear rotatable about said second pin means, said recliner gear meshing with said toothed rack,
 locking means for selectively restraining rotation of said recliner gear including a locking pawl connected to said lower recliner structure and engageable with said recliner gear, a shaft journaled to said lower recliner structure, a cam connected to said shaft, and an actuation handle for enabling rotation of said shaft, said cam having a cam surface which urges said locking pawl into engagement with said recliner gear in one angular position of said shaft thereby fixing said reclining angle, and relieves said urging in another angular position of said shaft thereby enabling said reclining angle to be adjusted,
 a restraint pawl carried by said shaft for relative rotation thereabout connected to said lower recliner structure and engageable with said upper recliner structure, said restraint pawl acting with said locking means to limit pivoting movement of said upper recliner structure with respect to said lower recliner structure whereby said restraint pawl will limit said pivoting movement in the event of a malfunction of said locking means,
 means for causing rotation of said restraint pawl including a third pin means connected to said cam and wherein said restraint pawl defines an arcuate slot, said third pin means and said slot cooperating such that rotation of said shaft beyond said predetermined angular extent causes rotation of said restraint pawl.

25. A seat recliner mechanism for supporting a seat back and seat bottom which permits the reclining angle therebetween to be adjusted, comprising:

a lower recliner structure adapted for supporting said seat bottom, an upper recliner structure adapted for supporting said seat back, a quadrant which controls the relative angular position between said upper and lower recliner structures having a curved toothed rack formed along an edge thereof, first pin means for rotatably connecting said lower recliner structure, said upper recliner structure and said quadrant, second pin means connected to said lower recliner structure, a recliner gear rotatable about said second pin means, said recliner gear meshing with said quadrant toothed rack, locking means for selectively restraining rotation of said recliner gear including a locking pawl connected to said lower recliner structure and engageable with said recliner gear, and means for positioning said locking pawl into or out of engagement with said recliner gear, a shaft journaled to said lower recliner structure, a cam connected to said shaft, and an actuation handle for enabling rotation of said shaft, said cam having a cam surface which urges said locking pawl into engagement with said recliner gear in one angular position of said shaft thereby fixing said reclining angle and relieves said urging in another angular position of said shaft thereby enabling said reclining angle to be adjusted, a restraint pawl connected to said lower recliner structure and engageable with said quadrant for limiting movement of said quadrant, said restraint pawl acting with said locking means to limit pivoting movement of said upper recliner structure with respect to said lower recliner structure whereby said restraint pawl will limit said pivoting movement in the event of malfunction of said locking means, and means for causing rotation of said restraint pawl including a third pin means connected to said cam and wherein said restraint pawl defines an arcuate slot, said third pin means and said slot cooperating such that rotation of said shaft beyond said predetermined angular extent causes rotation of said restraint pawl.

26. A seat recliner mechanism for supporting a seat back and seat bottom which permits the reclining angle therebetween to be adjusted, comprising:

a first recliner structure for supporting said seat bottom, a second recliner structure for supporting said seat back, said second recliner structure pivotally carried by said first recliner structure;

a toothed rack coupled to and movable with one of said recliner structures;

an actuator carried by the other of said recliner structures;

a recliner gear rotatably carried by the other of said recliner structures and having a first toothed portion meshing with said toothed rack and a second toothed portion, locking means operatively connected to said actuator for movement from an engaged position with said second toothed portion of said recliner gear thereby restraining said toothed rack and fixing said reclining angle, to a released position wherein said toothed rack is disengaged thereby permitting said reclining angle to be adjusted, and a restraint pawl operatively connected to said actuator and operating in parallel with said locking means for movement from an engaging position with said second recliner structure to limit pivoting movement of said second recliner structure once said locking means is in said engaged position whereby said restraint pawl will limit said pivoting movement in the event of a malfunction of said locking means, and said restraint pawl is moveable to a released position permitting said reclining angle to be adjusted.

27. The seat recliner according to claim 26 wherein said locking means comprises a locking pawl coupled to said actuator and engaging with said second toothed portion when said locking means is in said engaged position and disengaging with said second toothed portion when said locking means is in said released position.

28. The seat recliner according to claim 27 wherein said actuator comprises a lever connected to a shaft rotatably carried by the other of said recliner structures and wherein said locking means further comprises a cam rotatable with said shaft which urges said pawl into engagement with said recliner gear in one angular position of said shaft, and relieves said urging in another angular position of said shaft.

29. A seat recliner mechanism for supporting a seat back and seat bottom which permits the reclining angle therebetween to be adjusted, comprising:

a first recliner structure for supporting said seat bottom;

a second recliner structure for supporting said seat back; said second recliner structure pivotally carried by said first recliner structure;

a toothed rack coupled to and movable with one of said recliner structures;

an actuator carried by the other of said recliner structures;

a recliner gear rotatably carried by the other of said recliner structures and having a first toothed portion meshing with said toothed rack and a second toothed portion;

locking means operatively connected to said actuator for movement from an engaged position with said second toothed portion of said recliner gear thereby restraining said toothed rack and fixing said reclining angle, to a released position wherein said toothed rack is disengaged thereby permitting said reclining angle to be adjusted;

a restraint pawl operatively connected to said actuator for movement from an engaging position with said second recliner structure to limit pivoting movement of said second recliner structure once said locking means is in said engaged position whereby said restraint pawl will limit said pivoting movement in the event of a malfunction of said locking means, and said restraint pawl is moveable to a released position permitting said reclining angle to be adjusted;

said locking means comprising a locking pawl coupled to said actuator and engaging with said second toothed portion when said locking means is in said engaged position and disengaging with said second toothed portion when said locking means is in said released position;

said actuator comprises a lever connected to a shaft rotatably carried by the other of said recliner structures and wherein said locking means further comprises a cam rotatable with said shaft which urges said locking pawl into engagement with said recliner gear in one angular position of said shaft, and relieves said urging in another angular position of said shaft; and said restraint pawl is carried by said shaft for relative rotation thereabout.

30. The seat recliner mechanism according to claim 29 further comprising means for causing rotation of said restraint pawl once said cam has been rotated beyond a predetermined angular extent.

31. The seat recliner mechanism according to claim 30 wherein said means for causing rotation of said restraint pawl comprises a pin means connected to said cam and said restraint pawl defines an arcuate slot, said pin means and said slot cooperating such that rotation of said shaft beyond said predetermined angular extent causes rotation of said restraint pawl.

32. The seat recliner mechanism according to claim 29 wherein said locking pawl is fixed to said first recliner structure for pivoting movement and said seat recliner mechanism further comprises first spring means for biasing said locking pawl out of engagement with said recliner gear.

33. The seat recliner mechanism according to claim 32 further comprising second spring means for biasing said restraint pawl toward a position of engagement with said second recliner structure.

* * * * *